US008854961B1

(12) United States Patent
Cohen

(10) Patent No.: US 8,854,961 B1
(45) Date of Patent: Oct. 7, 2014

(54) INTEGRATED CIRCUIT FOR NETWORK STRESS TESTING

(75) Inventor: Yuval Cohen, Raanana (IL)

(73) Assignee: Marvell International Ltd., Hamilton (BM)

( * ) Notice: Subject to any disclaimer, the term of this patent is extended or adjusted under 35 U.S.C. 154(b) by 459 days.

(21) Appl. No.: 13/267,248

(22) Filed: Oct. 6, 2011

Related U.S. Application Data

(63) Continuation of application No. 11/031,984, filed on Jan. 7, 2005, now Pat. No. 8,036,123.

(60) Provisional application No. 60/642,483, filed on Jan. 7, 2005.

(51) Int. Cl.
H04L 12/26 (2006.01)

(52) U.S. Cl.
USPC ........................................................ 370/230.1

(58) Field of Classification Search
CPC ......... H04L 12/26; H04L 1/242; H04L 1/244; H04L 41/14; H04L 43/00
USPC .............. 370/229, 230, 230.1, 232, 235, 250, 370/251, 252, 253, 395.4, 231, 249
See application file for complete search history.

(56) References Cited

U.S. PATENT DOCUMENTS

| | | | |
|---|---|---|---|
| 5,936,940 A | 8/1999 | Marin et al. | |
| 5,991,830 A | 11/1999 | Beard et al. | |
| 6,327,274 B1 | 12/2001 | Ravikanth | |
| 6,360,271 B1 | 3/2002 | Schuster et al. | |
| 6,570,850 B1 | 5/2003 | Gutierrez et al. | |
| 6,608,816 B1 | 8/2003 | Nichols | |
| 6,618,396 B1 | 9/2003 | Kondo et al. | |
| 6,633,540 B1 * | 10/2003 | Raisanen et al. ........... 370/230.1 |
| 6,643,612 B1 | 11/2003 | Lahat et al. | |
| 6,661,810 B1 | 12/2003 | Skelly et al. | |
| 6,700,876 B1 | 3/2004 | DiNicola et al. | |
| 6,731,631 B1 | 5/2004 | Chang et al. | |
| 6,731,638 B1 | 5/2004 | Ofek | |
| 6,766,309 B1 | 7/2004 | Cheng et al. | |
| 6,766,389 B2 | 7/2004 | Hayter et al. | |
| 6,778,493 B1 | 8/2004 | Ishii | |
| 6,839,794 B1 | 1/2005 | Schober | |

(Continued)

FOREIGN PATENT DOCUMENTS

WO    WO 00/3793    6/2000

OTHER PUBLICATIONS

U.S. Appl. No. 11/056,753, filed Feb. 11, 2005, entitled, "Integrated Circuit for Network Delay and Jitter Testing".

(Continued)

*Primary Examiner* — Raj Jain

(57) ABSTRACT

An integrated circuit includes a first port configured to receive packets and a packet definition. The packets are transmitted from a network to the integrated circuit. One of (i) the packet definition is transmitted from a central processing unit of a host to the integrated circuit and (ii) the packets include the packet definition. The packet definition identifies characteristics of a packet. A forwarding engine is configured to (i) receive the packets from the first port and (ii) forward the packets to a second port. A packet generator is configured to (i) receive the packet definition and (ii) originate a test packet according to the packet definition. A medium access controller is configured to test the network by transmitting the test packet to the network.

20 Claims, 10 Drawing Sheets

(56) References Cited

U.S. PATENT DOCUMENTS

| | | |
|---|---|---|
| 6,865,675 B1 | 3/2005 | Epstein |
| 6,904,014 B1 | 6/2005 | Gai |
| 6,940,831 B1 | 9/2005 | Omi et al. |
| 6,954,430 B2 | 10/2005 | Haglund |
| 6,976,085 B1 | 12/2005 | Aviani et al. |
| 6,996,062 B1 | 2/2006 | Freed et al. |
| 7,088,677 B1 | 8/2006 | Burst, Jr. |
| 7,222,255 B1 | 5/2007 | Claessens et al. |
| 7,274,714 B2 | 9/2007 | Raisanen et al. |
| 7,864,816 B1 | 1/2011 | Cohen |
| 8,036,123 B1 | 10/2011 | Cohen |
| 2001/0004352 A1 | 6/2001 | Watanabe et al. |
| 2002/0024973 A1 | 2/2002 | Tavana et al. |
| 2002/0080791 A1 | 6/2002 | Sylvain |
| 2002/0103937 A1* | 8/2002 | Tillmann et al. ............... 709/246 |
| 2003/0035371 A1 | 2/2003 | Reed et al. |
| 2003/0152028 A1 | 8/2003 | Raisanen et al. |
| 2003/0165160 A1 | 9/2003 | Minami |
| 2003/0172177 A1* | 9/2003 | Kersley et al. ................ 709/236 |
| 2003/0229485 A1 | 12/2003 | Nishikawa |
| 2004/0071084 A1 | 4/2004 | El-Hennawey et al. |
| 2005/0058083 A1 | 3/2005 | Rogers |
| 2005/0094643 A1 | 5/2005 | Wang et al. |
| 2005/0099952 A1 | 5/2005 | Mohan et al. |
| 2005/0157675 A1 | 7/2005 | Feder et al. |
| 2005/0243822 A1 | 11/2005 | Jain et al. |
| 2005/0270982 A1* | 12/2005 | McBeath ...................... 370/252 |
| 2006/0007960 A1 | 1/2006 | Liu et al. |
| 2006/0227706 A1 | 10/2006 | Burst |
| 2007/0147258 A1 | 6/2007 | Mottishaw et al. |

OTHER PUBLICATIONS

IEEE P802.1ag/D0.0, Draft Standard for Local and Metropolitan Area Networks, Virtual Bridged Local Area Networks—Amendment 5: Connectivity Fault Management; May 6, 2004, 72 pages.

\* cited by examiner

INTEGRATED CIRCUIT FOR NETWORK STRESS TESTING

CROSS-REFERENCE TO RELATED APPLICATIONS

This application is a continuation of U.S. patent application Ser. No. 11/031,984 filed on Jan. 7, 2005. This application is related to U.S. application Ser. No. 12/963,372, filed Dec. 8, 2010, which is a continuation of U.S. application Ser. No. 11/056,753 (now U.S. Pat. No. 7,864,816), filed Feb. 11, 2005, which claims the benefit of U.S. Provisional App. No. 60/642,483, filed Jan. 7, 2005. The disclosures of the above applications are incorporated herein by reference in their entirety.

FIELD

The present disclosure relates generally to network testing. More particularly, the present invention relates to integrated circuits for stress testing a network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Data networks are becoming increasingly important to all sectors of the economy. As the reliance on these data networks rises, so do the costs of network downtime or even less than optimal network performance. For these reasons, network testing, troubleshooting, and monitoring has also become increasingly important.

One approach to network testing is to purchase and deploy specialized network test equipment to test the network. One disadvantage of this approach is that such equipment is very expensive, especially when capable of testing very fast networks. Another disadvantage is that installing this specialized equipment to obtain meaningful measurements usually requires changing the network topology, possibly interfering with the normal operation of the network.

Another approach is to run network testing applications in existing network devices such as routers and the like that have built-in central processing units (CPUs). One disadvantage of this approach is that the network testing applications burden the CPUs and therefore reduce the performance of such network devices in their normal network roles. Furthermore, these CPUs are limited in performance relative to the number of ports and their speed in the network, and so cannot handle traffic at wirespeed.

SUMMARY

An integrated circuit is provided and includes a first port configured to receive packets and a packet definition. The packets are transmitted from a network to the integrated circuit. One of (i) the packet definition is transmitted from a central processing unit of a host to the integrated circuit and (ii) the packets include the packet definition. The packet definition identifies characteristics of a packet. A forwarding engine is configured to (i) receive the packets from the first port and (ii) forward the packets to a second port. A packet generator is configured to (i) receive the packet definition and (ii) originate a test packet according to the packet definition. A medium access controller is configured to test the network by transmitting the test packet to the network.

In one aspect, an integrated circuit includes ports to transmit and receive packets of data; a forwarding engine to transfer the packets of data between the ports; and a controller to receive one or more packet definitions that specify characteristics of a packet; and wherein at least one of the ports include a packet generator to originate one or more packets of data according to one or more of the packet definitions received by the controller.

Particular implementations can include one or more of the following features. The at least one of the ports further includes a network transmit interface to transmit the one or more packets of data originated by the packet generator. The at least one of the ports further includes an egress queue to store the packets of data received by the at least one of the ports from the forwarding engine; a test queue to store the packets of data originated by the packet generator; and a scheduler including a first input in communication with the egress queue, a second input in communication with the test queue, and an output in communication with the network transmit interface. The one or more packet definitions include at least one of the group consisting of an address definition that specifies one or more addresses for the one or more packets of data to be originated by the packet generator; a load definition that specifies a number of the one or more packets of data to be originated by the packet generator; a protocol definition that specifies one or more network protocols for the one or more packets of data to be originated by the packet generator; a payload definition that specifies one or more data patterns for payloads of the one or more packets of data to be originated by the packet generator; a data rate definition that specifies one or more data rates at which the one or more packets of data to be originated by the packet generator are to be transmitted; and a quality of service definition that specifies one or more qualities of service for the one or more packets of data to be originated by the packet generator. The at least one of the ports further includes a network receive interface to receive one or more packets of data representing a number of the one or more packets of data originated by the packet generator and transmitted by the network transmit interface that were received by one or more network devices; and wherein the controller determines a packet loss based on a number of the one or more packets of data originated by the packet generator and transmitted by the network transmit interface to the one or more network devices and the number of the one or more packets of data originated by the packet generator that were received by the one or more network devices. The controller determines the packet loss based on one or more properties of the one or more packets of data originated by the packet generator and transmitted by the network transmit interface. The one or more properties include at least one of the group consisting of a source address of the packet of data representing the number of the one or more packets of data originated by the packet generator and transmitted by the network transmit interface that were received by a network device; a destination address of the one or more packets of data originated by the packet generator and transmitted by the network transmit interface; and one or more qualities of service for the one or more packets of data originated by the packet generator and transmitted by the network transmit interface. The at least one of the ports further includes a network receive interface to receive packets of data; and wherein the integrated circuit further includes a classifier to identify the packets of data that were received by the network receive interface in reply to packets of data that were originated and transmitted by one of the ports in the integrated circuit, and a counter to count a number of the packets of data received by the network receive interface in reply to the one or more packets of data that were originated and transmitted by the one of the ports in the integrated circuit. The controller determines a packet loss based on a number of the packets of data that were originated and transmitted by the one of the ports in the integrated circuit and the number of the packets of data received by the network receive interface in reply to the one or more packets of data that were originated and transmitted by the one of the ports in the integrated circuit. The at least one of the ports further includes an ingress queue to store the packets of data received by the network receive interface. The at least one of the ports further includes a network receive interface to receive packets of data; and wherein the integrated circuit further includes a classifier to determine one or more properties of the packets of data received by the network receive interface, and a counter to count a number of packets of data received by the network receive interface and having properties that match one or more property definitions. The at least one of the ports further includes an ingress queue to store the packets of data received by the network receive interface. The one or more property definitions include at least one of the group consisting of a value for a field in the packets of data that indicates the packets of data were originated by one of the ports in the integrated circuit; and a value for a field in the packets of data that indicates the packets of data were originated by a port in another integrated circuit; and one or more qualities of service for the packets of data. The at least one of the ports receives a request for the contents of the counter; and transmits a packet of data including the contents of the counter. A network switch includes the integrated circuit. An Ethernet switch includes the network switch. A network device including the integrated circuit. The network device further includes a user interface to provide the one or more packet definitions to the integrated circuit. A network device including the integrated circuit. The network device further includes a user interface to provide the one or more property definitions to the integrated circuit, and to retrieve the contents of the counter.

In another aspect, a method for an integrated circuit includes transmitting and receiving packets of data on ports of the integrated circuit; transferring the packets of data between the ports; receiving one or more packet definitions that specify characteristics of a packet; and originating one or more packets of data according to one or more of the packet definitions.

Particular implementations can include one or more of the following features. The method further includes transmitting the one or more packets of data originated by the integrated circuit. The one or more packet definitions include at least one of the group consisting of an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The method further includes: receiving one or more packets of data representing a number of the one or more packets of data originated and transmitted by the integrated circuit that were received by one or more network devices; and determining a packet loss based on a number of the one or more packets of data originated and transmitted by the integrated circuit and the number of the one or more packets of data originated and transmitted to the one or more network devices by the integrated circuit that were received by the one or more network devices. The method further includes: determining the packet loss based on one or more properties of the one or more packets of data originated and transmitted by the integrated circuit. The one or more properties include at least one of the group consisting of a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The method further includes: receiving packets of data; and counting a number of the received packets of data that were received in reply to the one or more packets of data originated and transmitted by the integrated circuit. The method further includes: determining a packet loss based on a number of the packets of data that were originated and transmitted by the integrated circuit and the number of received packets of data received in reply to the one or more packets of data originated and transmitted by the integrated circuit. The method further includes: receiving packets of data; determining one or more properties of the received packets of data; and counting a number of the received packets of data having properties that match one or more property definitions. The one or more property definitions include at least one of the group consisting of: a value for a field in the packets of data that indicates the packets of data were originated by the integrated circuit; and a value for a field in the packets of data that indicates the packets of data were originated by another integrated circuit; and one or more qualities of service for the packets of data. The method further includes: receiving a request for the number of packets of data received by the network receive interface that have properties that match the one or more property definitions; and transmitting a packet of data including the number of packets of data received by the network receive interface that have properties that match the one or more property definitions.

In another aspect, an integrated circuit includes: one or more ports to transmit and receive packets of data; a host interface to transmit and receive the packets of data; a controller to receive one or more packet definitions that specify characteristics of a packet; and wherein at least one of the ports includes a packet generator to originate one or more packets of data according to one or more of the packet definitions received by the controller.

Particular implementations can include one or more of the following features. The at least one of the ports further includes: a network transmit interface to transmit the one or more packets of data originated by the packet generator. The at least one of the ports further includes: an egress queue to store the packets of data received by the at least one of the ports from the host interface; a test queue to store the packets of data originated by the packet generator; and a scheduler including a first input in communication with the egress queue, a second input in communication with the test queue, and an output in communication with the network transmit interface. The one or more packet definitions include at least one of the group consisting of: an address definition that specifies one or more addresses for the one or more packets of data to be originated by the packet generator; a load definition that specifies a number of the one or more packets of data to be originated by the packet generator; a protocol definition that specifies one or more network protocols for the one or more packets of data to be originated by the packet generator; a payload definition that specifies one or more data patterns for payloads of the one or more packets of data to be originated by the packet generator; a data rate definition that specifies one or more data rates at which the one or more packets of data to be originated by the packet generator are to be transmitted; and a quality of service definition that specifies one or more qualities of service for the one or more packets of data to be originated by the packet generator. The at least one of the ports further includes: a network receive interface to receive one or more packets of data representing a number of the one or more packets of data originated by the packet generator and transmitted by the network transmit interface that were received by one or more network devices; and wherein the controller determines a packet loss based on a number of the one or more packets of data originated by the packet generator and transmitted by the network transmit interface to the one or more network devices and the number of the one or more packets of data originated by the packet generator and transmitted by the network transmit interface that were received by the one or more network devices. The controller determines the packet loss based on one or more properties of the one or more packets of data originated by the packet generator and transmitted by the network transmit interface. The one or more properties include at least one of the group consisting of: a source address of the packet of data representing the number of the one or more packets of data originated by the packet generator and transmitted by the network transmit interface that were received by a network device; a destination address of the one or more packets of data originated by the packet generator and transmitted by the network transmit interface; and one or more qualities of service for the one or more packets of data originated by the packet generator and transmitted by the network transmit interface. The at least one of the ports further includes a network receive interface to receive packets of data; and wherein the integrated circuit further includes a classifier to identify the packets of data that were received by the network receive interface in reply to packets of data that were originated and transmitted by one of the ports in the integrated circuit, and a counter to count a number of the one or more packets of data received by the network receive interface in reply to the packets of data that were originated and transmitted by the one of the ports in the integrated circuit. The controller determines a packet loss based on a number of the packets of data that were originated and transmitted by the one of the ports in the integrated circuit and the number of the packets of data received by the network receive interface in reply to the one or more packets of data that were originated and transmitted by the one of the ports in the integrated circuit. The at least one of the ports further includes: an ingress queue to store the packets of data received by the network receive interface. The at least one of the ports further includes a network receive interface to receive packets of data; and wherein the integrated circuit further includes a classifier to determine one or more properties of the packets of data received by the network receive interface, and a counter to count a number of packets of data received by the network receive interface and having properties that match one or more property definitions. At least one of the ports further includes: an ingress queue to store the packets of data received by the network receive interface. The one or more property definitions include at least one of the group consisting of: a value for a field in the packets of data that indicates the packets of data were originated by one of the ports in the integrated circuit; a value for a field in the packets of data that indicates the packets of data were originated by a port in another integrated circuit; and one or more qualities of service for the packets of data. The at least one of the ports: receives a request for the contents of the counter; and transmits a packet of data including the contents of the counter. A network interface controller (NIC) includes. A network device includes the integrated circuit. The network device further includes: a user interface to provide the one or more packet definitions to the integrated circuit. A network device includes the integrated circuit. The network device of further includes: a user interface to provide the one or more property definitions to the integrated circuit, and to retrieve the contents of the counter.

In one aspect, a method for an integrated circuit includes: transmitting and receiving packets of data on one or more ports of the integrated circuit; transmitting and receiving packets of data on a host interface of the integrated circuit; receiving one or more packet definitions that specify characteristics of a packet; and originating one or more packets of data according to one or more of the packet definitions. The method further includes: transmitting the one or more packets of data on one or more of the one or more ports. The one or more packet definitions include at least one of the group consisting of: an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The method further includes: receiving one or more packets of data representing a number of the one or more packets of data originated and transmitted by the integrated circuit that were received by one or more network devices; and determining a packet loss based on a number of the one or more packets of data originated and transmitted to the one or more network devices by the integrated circuit and the number of the one or more packets of data originated and transmitted by the integrated circuit that were received by the one or more network devices. The method further includes: determining the packet loss based on one or more properties of the one or more packets of data originated and transmitted by the integrated circuit. The one or more properties include at least one of the group consisting of: a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The method further includes: receiving packets of data; and counting a number of the received packets of data that were received in reply to the one or more packets of data originated and transmitted by the integrated circuit. The method further includes: determining a packet loss based on a number of the packets of data that were originated and transmitted by the integrated circuit and the number of packets of data received in reply to the one or more packets of data originated and transmitted by the integrated circuit. The method further includes: receiving packets of data; and determining one or more properties of the packets of data received by the integrated circuit, and counting a number of the packets of data received by the integrated circuit and having properties that match one or more property definitions. The one or more property definitions include at least one of the group consisting of: a value for a field in the packets of data that indicates the packets of data were originated by the integrated circuit; a value for a field in the packets of data that indicates the packets of data were originated by another integrated circuit; and one or more qualities of service for the packets of data. The method further includes: receiving a request for the number of packets of data received by the integrated circuit that have properties that match the one or more property definitions; and transmitting a packet of data includes the number of packets of data received by the integrated circuit that have properties that match the one or more property definitions.

In one aspect, an integrated circuit includes: port means for transmitting and receiving packets of data; forwarding means for transferring the packets of data between the port means; and controller means for receiving one or more packet definitions that specify characteristics of a packet; and wherein at least one of the port means includes packet generator means for originating one or more packets of data according to one or more of the packet definitions received by the controller means.

Particular implementations can include one or more of the following features. The at least one of the port means further includes: network transmit interface means for transmitting the one or more packets of data originated by the packet generator means. The at least one of the port means further includes: egress queue means for storing the packets of data received by the at least one of the port means from the forwarding means; test queue means for storing the packets of data originated by the packet generator means; and scheduler means includes first input means for communicating with the egress queue means, second input means for communicating with the test queue means, and output means for communicating with the network transmit interface means. The one or more packet definitions include at least one of the group consisting of: an address definition that specifies one or more addresses for the one or more packets of data to be originated by the packet generator means; a load definition that specifies a number of the one or more packets of data to be originated by the packet generator means; a protocol definition that specifies one or more network protocols for the one or more packets of data to be originated by the packet generator means; a payload definition that specifies one or more data patterns for payloads of the one or more packets of data to be originated by the packet generator means; a data rate definition that specifies one or more data rates at which the one or more packets of data to be originated by the packet generator means are to be transmitted; and a quality of service definition that specifies one or more qualities of service for the one or more packets of data to be originated by the packet generator means. The at least one of the port means further includes: network receive interface means for receiving one or more packets of data representing a number of the one or more packets of data originated by the packet generator means and transmitted by the network transmit interface means that were received by one or more network devices; and wherein the controller means determines a packet loss based on a number of the one or more packets of data originated by the packet generator means and transmitted by the network transmit interface means to the one or more network devices and the number of the one or more packets of data originated by the packet generator means that were received by the one or more network devices. The controller means determines the packet loss based on one or more properties of the one or more packets of data originated by the packet generator and transmitted by the network transmit interface means. The one or more properties include at least one of the group consisting of: a source address of the packet of data representing the number of the one or more packets of data originated by the packet generator means and transmitted by the network transmit interface means that were received by a network device; a destination address of the one or more packets of data originated by the packet generator means and transmitted by the network transmit interface means; and one or more qualities of service for the one or more packets of data originated by the packet generator means and transmitted by the network transmit interface means. The at least one of the ports further includes a network receive interface means for receiving packets of data; and wherein the integrated circuit further includes classifier means for identifying the packets of data that were received by the network receive interface means in reply to packets of data that were originated and transmitted by one of the port means in the integrated circuit, and counter means for counting a number of the packets of data received by the network receive interface means in reply to the one or more packets of data that were originated and transmitted by the one of the port means in the integrated circuit. The controller means determines a packet loss based on a number of the packets of data that were originated and transmitted by the one of the port means in the integrated circuit and the number of the packets of data received by the network receive interface means in reply to the one or more packets of data that were originated and transmitted by the one of the port means in the integrated circuit. The at least one of the port means further includes: ingress queue means for storing the packets of data received by the network receive interface means. The at least one of the ports further includes a network receive interface means for receiving packets of data; and wherein the integrated circuit further includes classifier means for determining one or more properties of the packets of data received by the network receive interface means, and counter means for counting a number of packets of data received by the network receive interface means and having properties that match one or more property definitions. The at least one of the port means further includes: ingress queue means for storing the packets of data received by the network receive interface means. The one or more property definitions include at least one of the group consisting of: a value for a field in the packets of data that indicates the packets of data were originated by one of the port means in the integrated circuit; and a value for a field in the packets of data that indicates the packets of data were originated by a port in another integrated circuit; and one or more qualities of service for the packets of data. The at least one of the port means: receives a request for the contents of the counter means; and transmits a packet of data includes the contents of the counter means. A network switch includes the integrated circuit. An Ethernet switch includes the network switch. A network device includes the integrated circuit. The network device further includes: user interface means for providing the one or more packet definitions to the integrated circuit. A network device includes the integrated circuit. The network device further includes: user interface means for providing the one or more property definitions to the integrated circuit, and for retrieving the contents of the counter.

In one aspect, a computer program for an integrated circuit includes: causing the integrated circuit to transmit and receive packets of data on ports of the integrated circuit; transferring the packets of data between the ports; receiving one or more packet definitions that specify characteristics of a packet; and originating one or more packets of data according to one or more of the packet definitions. The computer program further includes: causing the one or more packets of data originated by the integrated circuit to be transmitted. The one or more packet definitions include at least one of the group consisting of: an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The computer program further includes: receiving one or more packets of data representing a number of the one or more packets of data originated and transmitted by the integrated circuit that were received by one or more network devices; and determining a packet loss based on a number of the one or more packets of data originated and transmitted by the integrated circuit and the number of the one or more packets of data originated and transmitted to the one or more network devices by the integrated circuit that were received by the one or more network devices. The computer program further includes: determining the packet loss based on one or more properties of the one or more packets of data originated and transmitted by the integrated circuit. The one or more properties include at least one of the group consisting of a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The computer program further includes: receiving packets of data; and counting a number of the received packets of data that were received in reply to the one or more packets of data originated and transmitted by the integrated circuit. The computer program further includes: determining a packet loss based on a number of the packets of data that were originated and transmitted by the integrated circuit and the number of received packets of data received in reply to the one or more packets of data originated and transmitted by the integrated circuit. The computer program further includes: receiving packets of data; determining one or more properties of the received packets of data; and counting a number of the received packets of data having properties that match one or more property definitions. The one or more property definitions include at least one of the group consisting of: a value for a field in the packets of data that indicates the packets of data were originated by the integrated circuit; and a value for a field in the packets of data that indicates the packets of data were originated by another integrated circuit; and one or more qualities of service for the packets of data. The computer program further includes: receiving a request for the number of packets of data received by the network receive interface that have properties that match the one or more property definitions; and causing the integrated circuit to transmit a packet of data includes the number of packets of data received by the network receive interface that have properties that match the one or more property definitions.

In one aspect, an integrated circuit includes: one or more port means for transmitting and receiving packets of data; host interface means for transmitting and receiving the packets of data; controller means for receiving one or more packet definitions that specify characteristics of a packet; and wherein at least one of the port means includes packet generator means for originating one or more packets of data according to one or more of the packet definitions received by the controller means.

Particular implementations can include one or more of the following features. The at least one of the port means further includes: network transmit interface means for transmitting the one or more packets of data originated by the packet generator means. The at least one of the port means further includes: egress queue means for storing the packets of data received by the at least one of the port means from the host interface means; test queue means for storing the packets of data originated by the packet generator means; and scheduler means includes first input means for communicating with the egress queue means, second input means for communicating with the test queue means, and output means for communicating with the network transmit interface means. The one or more packet definitions include at least one of the group consisting of: an address definition that specifies one or more addresses for the one or more packets of data to be originated by the packet generator means; a load definition that specifies a number of the one or more packets of data to be originated by the packet generator means; a protocol definition that specifies one or more network protocols for the one or more packets of data to be originated by the packet generator means; a payload definition that specifies one or more data patterns for payloads of the one or more packets of data to be originated by the packet generator means; a data rate definition that specifies one or more data rates at which the one or more packets of data to be originated by the packet generator means are to be transmitted; and a quality of service definition that specifies one or more qualities of service for the one or more packets of data to be originated by the packet generator means. The at least one of the port means further includes: network receive interface means for receiving one or more packets of data representing a number of the one or more packets of data originated by the packet generator means and transmitted by the network transmit interface means that were received by one or more network devices; and wherein the controller means determines a packet loss based on a number of the one or more packets of data originated by the packet generator means and transmitted by the network transmit interface means to the one or more network devices and the number of the one or more packets of data originated by the packet generator means and transmitted by the network transmit interface means that were received by the one or more network devices. The controller means determines the packet loss based on one or more properties of the one or more packets of data originated by the packet generator means and transmitted by the network transmit interface means. The one or more properties include at least one of the group consisting of a source address of the packet of data representing the number of the one or more packets of data originated by the packet generator means and transmitted by the network transmit interface means that were received by a network device; a destination address of the one or more packets of data originated by the packet generator means and transmitted by the network transmit interface means; and one or more qualities of service for the one or more packets of data originated by the packet generator means and transmitted by the network transmit interface means. The at least one of the ports further includes network receive interface means for receiving packets of data; and wherein the integrated circuit further includes classifier means for identifying the packets of data that were received by the network receive interface means in reply to packets of data that were originated and transmitted by one of the port means in the integrated circuit, and counter means for counting a number of the one or more packets of data received by the network receive interface means in reply to the packets of data that were originated and transmitted by the one of the port means in the integrated circuit. The controller means determines a packet loss based on a number of the packets of data that were originated and transmitted by the one of the port means in the integrated circuit and the number of the packets of data received by the network receive interface means in reply to the one or more packets of data that were originated and transmitted by the one of the port means in the integrated circuit. The at least one of the port means further includes: ingress queue means for storing the packets of data received by the network receive interface means. The at least one of the port means further includes a network receive interface means to receive packets of data; and wherein the integrated circuit further includes classifier means for determining one or more properties of the packets of data received by the network receive interface means, and counter means for counting a number of packets of data received by the network receive interface means and having properties that match one or more property definitions. The at least one of the port means further includes: ingress queue means for storing the packets of data received by the network receive interface means. The one or more property definitions include at least one of the group consisting of a value for a field in the packets of data that indicates the packets of data were originated by one of the port means in the integrated circuit; a value for a field in the packets of data that indicates the packets of data were originated by a port in another integrated circuit; and one or more qualities of service for the packets of data. The at least one of the port means: receives a request for the contents of the counter means; and transmits a packet of data includes the contents of the counter means. A network interface controller (NIC) includes the integrated circuit. A network device includes the integrated circuit. The network device further includes: user interface means for providing the one or more packet definitions to the integrated circuit. A network device includes the integrated circuit. The network device further includes: user interface means for providing the one or more property definitions to the integrated circuit, and for retrieving the contents of the counter means.

In one aspect, a computer program for an integrated circuit includes: causing the integrated circuit to transmit and receive packets of data on one or more ports of the integrated circuit; causing the integrated circuit to transmit and receive packets of data on a host interface of the integrated circuit; receiving one or more packet definitions that specify characteristics of a packet; and originating one or more packets of data according to one or more of the packet definitions.

Particular implementations can include one or more of the following features. The computer program further includes: causing the integrated circuit to transmit the one or more packets of data on one or more of the one or more ports. The one or more packet definitions include at least one of the group consisting of an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The computer program further includes: receiving one or more packets of data representing a number of the one or more packets of data originated and transmitted by the integrated circuit that were received by one or more network devices; and determining a packet loss based on a number of the one or more packets of data originated and transmitted to the one or more network devices by the integrated circuit and the number of the one or more packets of data originated and transmitted by the integrated circuit that were received by the one or more network devices. The computer program further includes: determining the packet loss based on one or more properties of the one or more packets of data originated and transmitted by the integrated circuit. The one or more properties include at least one of the group consisting of: a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The computer program further includes: receiving packets of data; and counting a number of the received packets of data that were received in reply to the one or more packets of data originated and transmitted by the integrated circuit. The computer program further includes: determining a packet loss based on a number of the packets of data that were originated and transmitted by the integrated circuit and the number of packets of data received in reply to the one or more packets of data originated and transmitted by the integrated circuit. The computer program further includes: receiving packets of data; and determining one or more properties of the packets of data received by the integrated circuit, and counting a number of the packets of data received by the integrated circuit and having properties that match one or more property definitions. The one or more property definitions include at least one of the group consisting of: a value for a field in the packets of data that indicates the packets of data were originated by the integrated circuit; a value for a field in the packets of data that indicates the packets of data were originated by another integrated circuit; and one or more qualities of service for the packets of data. The computer program further includes: receiving a request for the number of packets of data received by the integrated circuit that have properties that match the one or more property definitions; and causing the integrated circuit to transmit a packet of data includes the number of packets of data received by the integrated circuit that have properties that match the one or more property definitions.

Further areas of applicability of the present disclosure will become apparent from the detailed description, the claims and the drawings. The detailed description and specific examples are intended for purposes of illustration only and are not intended to limit the scope of the disclosure.

Figure 1:
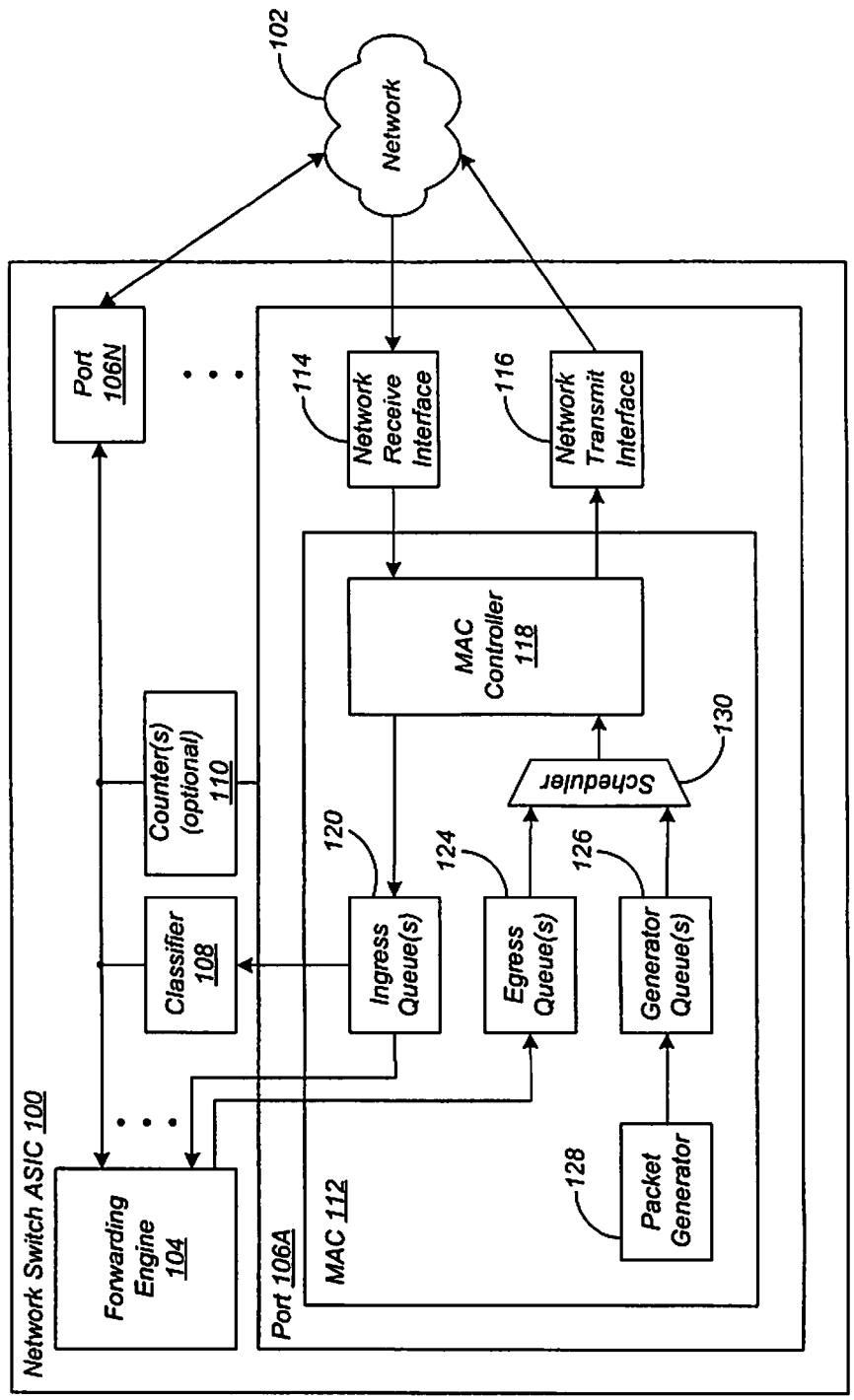
FIG. 1 shows a network switch application-specific integrated circuit (ASIC) in communication with a network according to the present disclosure.

The leading digit of each reference numeral used in this specification indicates the number of the drawing in which the reference numeral first appears.

DESCRIPTION

Embodiments of the present disclosure provide integrated circuits that conduct network stress testing at the media access control (MAC) level and above. Because the testing occurs at the ASIC level, the CPUs in network devices employing integrated circuits according to the present disclosure are only minimally burdened by the testing.

Integrated circuits according to the present disclosure can generate network traffic at wire speed, including specified high-level protocols and qualities of service. Integrated circuits according to the present disclosure can also analyze network traffic, including traffic originated by the present disclosure and traffic sent in reply to such traffic, including analysis of individual data flows and quality of service performance across the network.

The networks tested can include any sort of network such as wired, wireless, optical, and so on, and can range in scope from a single network device to very large networks including many network devices. While techniques of the present disclosure are described with respect to a network switch and a network interface controller, it will be understood by those skilled in the relevant arts after reading this description that techniques of the present disclosure can be implemented in other sorts of network devices as well, such as wireless access points, wireless clients, and the like.

FIG. 1 shows a network switch application-specific integrated circuit (ASIC) 100 in communication with a network 102 according to the present disclosure. ASIC 100 includes a forwarding engine 104 to transfer packets of data between ports 106A through 106N, a classifier 108 to determine properties of packets received by ASIC 100, and one or more optional counters 110 to count packets. In some embodiments, some or all of the counters 110 are implemented within ports 106. Preferably ASIC 100 includes various counters. Those on the port level simply count how many packets are received and sent. More sophisticated counters also on the port level can count certain type of packets based on low-level indications such as bad CRC, runt packets, packets too long, and the like. Each block includes additional counters that can count the criteria supported by that block. For example, forwarding engine 104 includes counters that can count how many packets have been received or sent on a specific route. As another example, classifier 108 includes counters that count only packets belonging to a specific flow.

FIG. 1 also shows detail of one of the ports 106A, which includes a media access controller (MAC) 112, a network receive interface 114 to receive packets of data from network 102, and a network transmit interface 116 to transmit packets of data to network 102. MAC 112 includes a MAC controller 118, one or more ingress queues 120 to store packets received by port 106A from network 102, and one or more egress queues 122 to store packets to be transmitted by port 106A to network 102. In some embodiments, some or all of the functions of MAC controller 118 are implemented in a central controller in ASIC 100.

Port 106A also includes a packet generator 128 to generate one or more packets according to one or more packet definitions that can be provided to ASIC 100, one or more generator queues 126 to store packets generated by packet generator 128, and a scheduler 130 to schedule packets in egress queues 124 and generator queues 126 for transmission to network 102. This arrangement permits ASIC 100 to conduct network testing while also handling regular network traffic.

Figure 2:
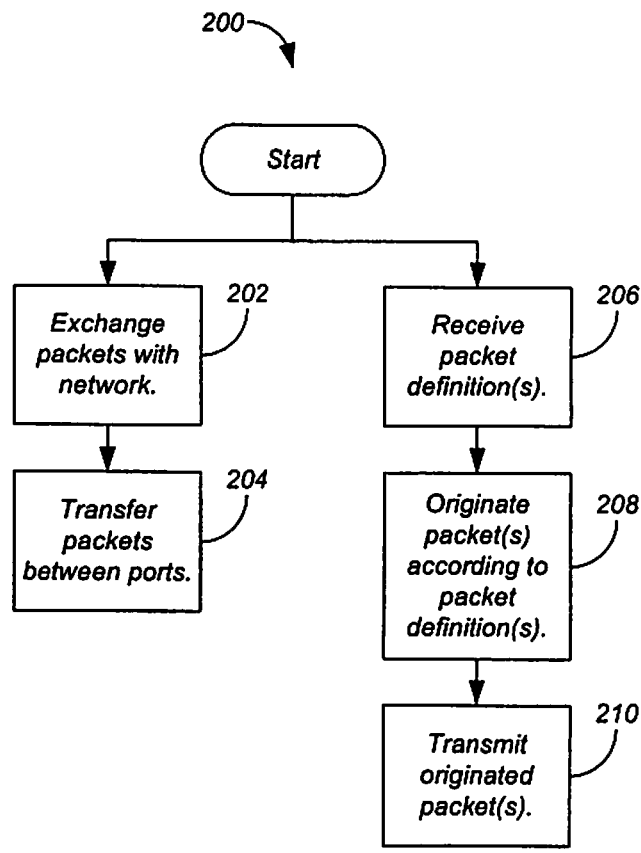
FIG. 2 shows a process for the ASIC of FIG. 1.

FIG. 2 shows a process 200 for ASIC 100 of FIG. 1. ASIC 100 operates as a network switch. Therefore ports 106 transmit and receive packets of data to and from network 102 (step 202) and forwarding engine 104 transfers the packets between ports 106 (step 204) according to methods well-known in the relevant arts.

Port 106A acts as a traffic generator to support network testing. MAC controller 118 receives one or more packet definitions (step 206), for example from a host CPU or in a packet from network 102. The packet definitions specify characteristics of the packets to be generated by port 106A. For example, the packet definitions can include an address definition that specifies one or more addresses, such as source and destination IP and MAC addresses, for the one or more packets of data to be originated by the packet generator, a load definition that specifies the number of packets to be generated, a target definition that specifies one or more destinations for the packets, a protocol definition that specifies one or more network protocols for the packets such as Open Shortest Path First Protocol (OSPF) and Routing Information Protocol (RIP), a payload definition that specifies one or more data patterns for payloads of the packets, a data rate definition that specifies one or more data rates at which the packets are to be transmitted, a quality of service definition that specifies one or more qualities of service for the packets, and the like.

Packet generator 128 originates one or more packets of data according to one or more of the packet definitions (step 208). Network transmit interface 116 transmits the one or more packets of data originated by the packet generator (step 210). As used herein, the terms "originate" and "originated" are used to indicate that the packets so described are packets that are generated by a packet generator 128 in a MAC 106, in contrast to packets that merely pass through a MAC 106, such as packets received from network 102 or forwarding engine 104.

This traffic generation function can be used to stress-test network 102 without burdening any CPU controlling ASIC 100. For example, in response to a packet definition provided by such a CPU, ASIC 100 can generate a specified number of packets at a specified data rate and quality of service including a specified payload and addressed to a specified network device. The only burden to the CPU is the time required to provide the packet definition.

Figure 3:
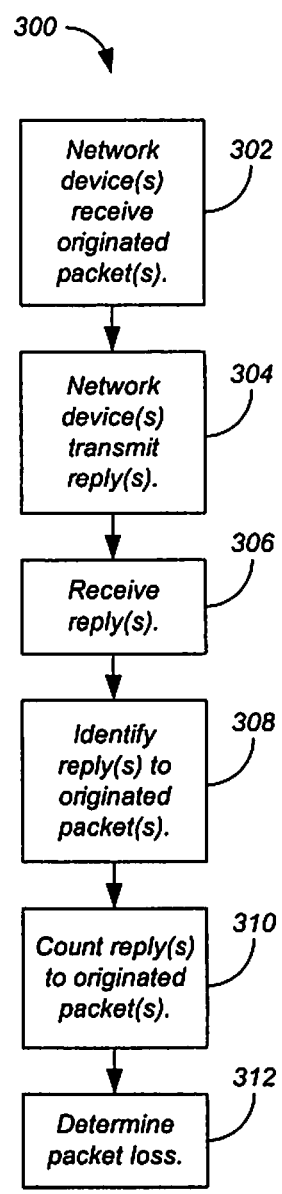
FIG. 3 shows a process for the ASIC of FIG. 1 to determine network throughput according to the two-way packet loss of the packets sent by the ASIC.

In some embodiments, ASIC 100 determines network throughput according to the two-way packet loss of the packets sent by ASIC 100, as shown in FIG. 3 as process 300. The packets originated and transmitted by port 106A are received by one or more network devices (step 302), which transmit replies to each of the packets (step 304).

Port 106A receives the reply packets (step 306) and stores them in ingress queues 120. Classifier 108 identifies the packets that were received in reply to the packets of data that were originated and transmitted by a port in ASIC 100 such as port 106A (step 308). Preferably classifier 108 is implemented according to a dual lookup for each packet, with one lookup to implement rules for handling test packets such as those received in reply to packets originated by a port 106 in an ASIC 100, and another lookup to implement rules for handling Access Control Lists and Quality of Service (QoS) rules for regular network traffic.

One or more of counters 110 counts the number of the packets received in reply to the packets that were originated and transmitted by one of the ports 106 in ASIC 100, such as port 106A (step 310). Controller 118 determines a packet loss based on the number of the packets that were originated and transmitted by one or more ports 106 in ASIC 100 and the number of packets received by ASIC 100 in reply to those packets (step 312).

Figure 4:
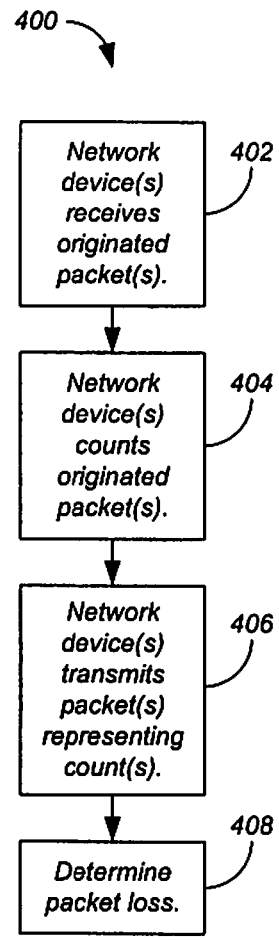
FIG. 4 shows a process for the ASIC of FIG. 1 to determine network throughput according to the one-way packet loss of the packets sent by the ASIC.

In some embodiments, ASIC 100 determines network throughput according to the one-way packet loss of the packets sent by ASIC 100, as shown in FIG. 4 as process 400. The packets originated and transmitted by port 106A are received by one or more network devices (step 402), which count the number of originated packets received (step 404) and transmit one or more packets to ASIC 100 representing those numbers (step 406).

Controller 118 determines the packet loss based on the number of packets of data originated by packet generator 128 and transmitted by network transmit interface 116 to the network devices and the number of those packets that were received by the network devices (step 408).

In some embodiments, the packet loss can be calculated based on a subset of the packets such as a specific data flow according to specified properties of the packets. For example, the packet loss determination can be limited to packets having one or more specified qualities of service, for example to verify the quality-of-service performance of network 102. Other example properties include source and destination addresses of the packets and the like.

Figure 5:
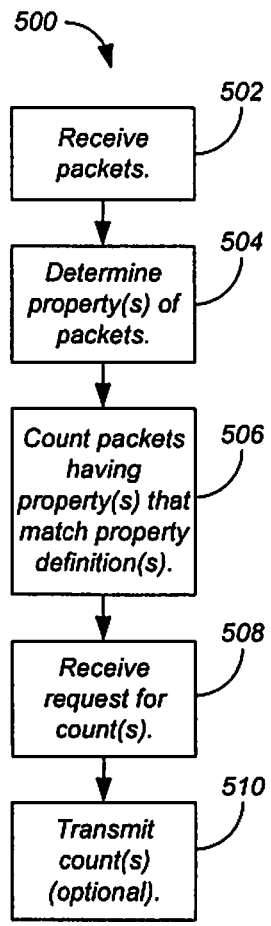
FIG. 5 shows a process for packet counting according to the present disclosure.

In some embodiments ASIC 100 also counts certain packets received from network 102, for example to support a packet loss calculation by another ASIC. FIG. 5 shows a process 500 for such packet counting. A port 106 in ASIC 100 receives packets (step 502) and stores them in ingress queues 120. Classifier 108 determines one or more properties of the packets (step 504). The classifier 108 may be implemented according to a dual lookup for each packet, as described above.

One or more of counters 110 counts the number of received packets having properties that match one or more property definitions (step 506). The property definitions can include, for example, a value for a field in the packets that indicates the packets were originated by one of the ports 106 in ASIC 100, a value for a field in packets that indicates the packets were originated by a port in another ASIC, one or more qualities of service for the packets, and the like.

ASIC 100 optionally transmits the packet count in response to a request. ASIC 100 receives a request for the contents of one or more of counters 110 (step 508). In response, ASIC 100 transmits a packet of data including the contents of counter(s) 110 (step 510).

ASIC 100 can be implemented in a network device such as a network switch. The network switch can include a user interface to provide the one or more packet definitions and property definitions to ASIC 100, and to retrieve data from ASIC 100, such as the contents of counter(s) 110.

Figure 6:
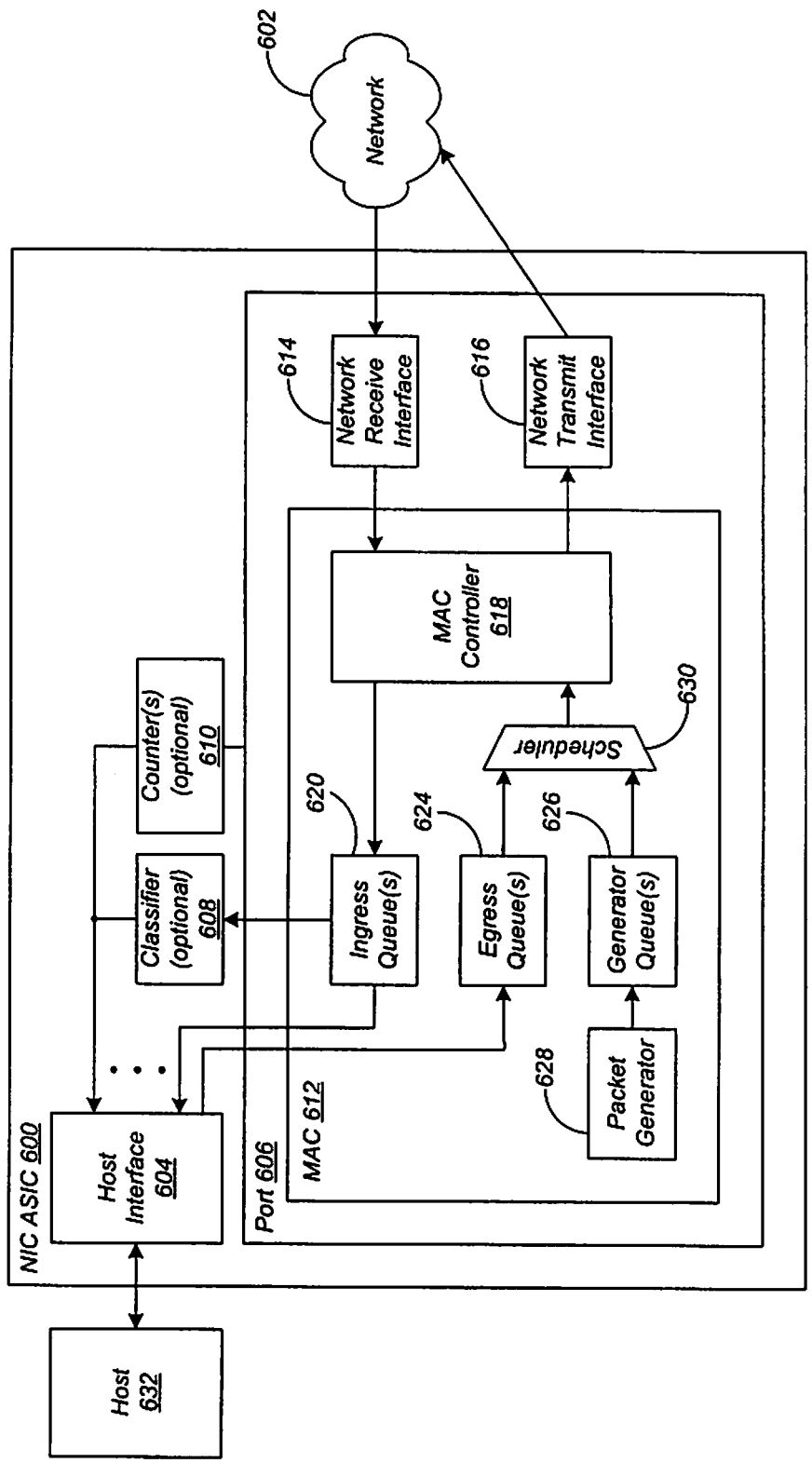
FIG. 6 shows a network interface controller ASIC in communication with a host and a network according to the present disclosure.

FIG. 6 shows a network interface controller ASIC 600 in communication with a host 632 and a network 602 according to the present disclosure. ASIC 600 includes a host interface 604 to exchange packets of data with host 632, a port 606 to exchange packets of data with network 602, a classifier 608 to determine properties of packets received by ASIC 600, and one or more optional counters 610 to count packets. In some embodiments, some or all of the counters 610 are implemented within port 606.

FIG. 6 also shows detail of port 606, which includes a media access controller (MAC) 612, a network receive interface 614 to receive packets of data from network 602, and a network transmit interface 616 to transmit packets of data to network 602. MAC 612 includes a MAC controller 618, one or more ingress queues 620 to store packets received by port 606 from network 602, and one or more egress queues 622 to store packets to be transmitted by port 606 to network 602. In some embodiments, some or all of the functions of MAC controller 618 are implemented in a central controller in ASIC 600.

Port 606 also includes a packet generator 628 to generate one or more packets according to one or more packet definitions that can be provided to ASIC 600 by host 632, one or more generator queues 626 to store packets generated by packet generator 628, and a scheduler 630 to schedule packets in egress queues 624 and generator queues 626 for transmission to network 602. This arrangement permits ASIC 600 to conduct network testing while also handling regular network traffic.

Figure 7:
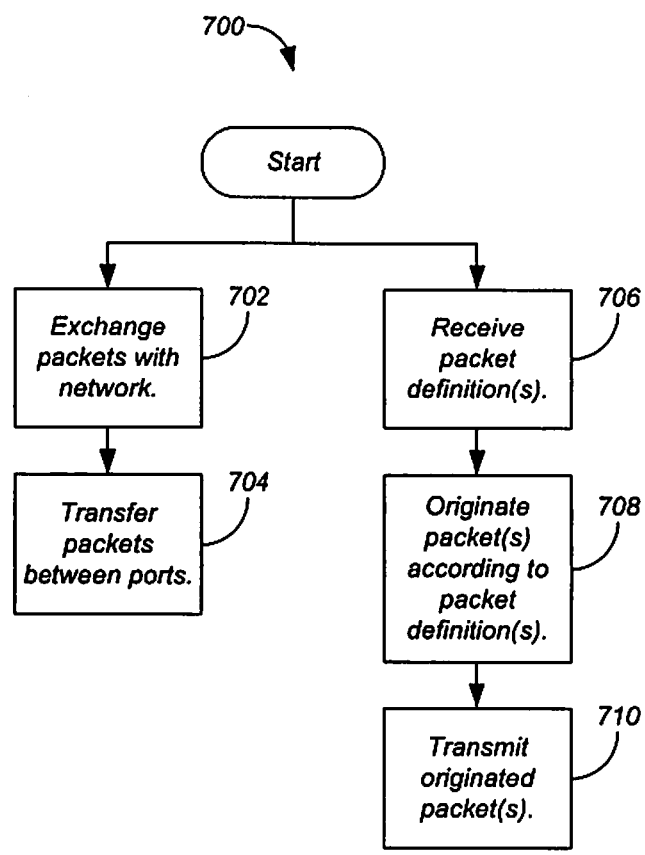
FIG. 7 shows a process for the ASIC of FIG. 6.

FIG. 7 shows a process 700 for ASIC 600 of FIG. 6. ASIC 600 operates as a network interface controller. Therefore port 606 transmits and receives packets of data to and from network 602 (step 702) and host interface 604 transfers the packets between port 606 and host 632 (step 704) according to methods well-known in the relevant arts.

Port 606 acts as a traffic generator to support network testing. MAC controller 618 receives one or more packet definitions (step 706), for example from a host CPU or in a packet from network 602. The packet definitions specify characteristics of the packets to be generated by port 606. For example, the packet definitions can include an address definition that specifies one or more addresses, such as source and destination IP and MAC addresses, for the one or more packets of data to be originated by the packet generator, a load definition that specifies the number of packets to be generated, a target definition that specifies one or more destinations for the packets, a protocol definition that specifies one or more network protocols for the packets such as Open Shortest Path First Protocol (OSPF) and Routing Information Protocol (RIP), a payload definition that specifies one or more data patterns for payloads of the packets, a data rate definition that specifies one or more data rates at which the packets are to be transmitted, a quality of service definition that specifies one or more qualities of service for the packets, and the like.

Packet generator 628 originates one or more packets of data according to one or more of the packet definitions (step 708). Network transmit interface 616 transmits the one or more packets of data originated by the packet generator (step 710). As used herein, the terms "originate" and "originated" are used to indicate that the packets so described are packets that are generated by a packet generator 628 in a MAC 606, in contrast to packets that merely pass through a MAC 606, such as packets received from network 602 or host interface 604.

This traffic generation function can be used to stress-test network 602 without burdening any CPU controlling ASIC 600. For example, in response to a packet definition provided by such a CPU, ASIC 600 can generate a specified number of packets at a specified data rate and quality of service including a specified payload and addressed to a specified network device. The only burden to the CPU is the time required to provide the packet definition.

Figure 8:
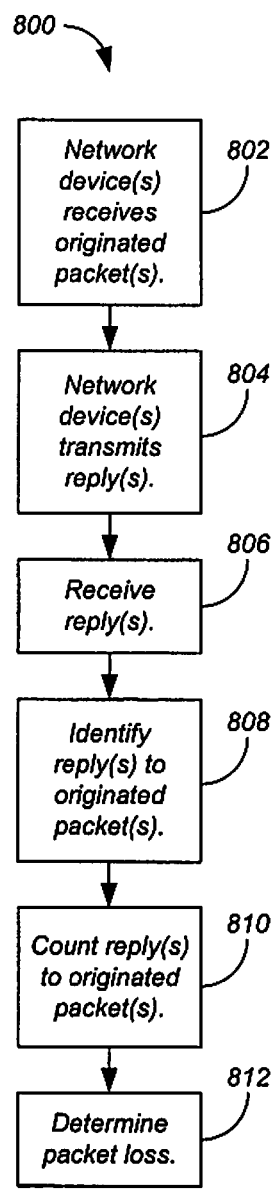
FIG. 8 shows a process for the ASIC of FIG. 6 to determine network throughput according to the two-way packet loss of the packets sent by the ASIC.

In some embodiments, ASIC 600 determines network throughput according to the two-way packet loss of the packets sent by ASIC 600, as shown in FIG. 8 as process 800. The packets originated and transmitted by port 606 are received by one or more network devices (step 802), which transmit replies to each of the packets (step 804).

Port 606 receives the reply packets (step 806) and stores them in ingress queues 620. Classifier 608 identifies the packets that were received in reply to the packets of data that were originated and transmitted by port 606 (step 808). Preferably classifier 608 is implemented according to a dual lookup for each packet, with one lookup to implement rules for handling test packets such as those received in reply to packets originated by a port 606 in an ASIC 600, and another lookup to implement rules for handling regular network traffic.

One or more of counters 610 counts the number of the packets received in reply to the packets that were originated and transmitted by one of the ports 606 in ASIC 600, such as port 606 (step 810). Controller 618 determines a packet loss based on the number of the packets that were originated and transmitted by port 606 in ASIC 600 and the number of packets received by ASIC 600 in reply to those packets (step 812).

Figure 9:
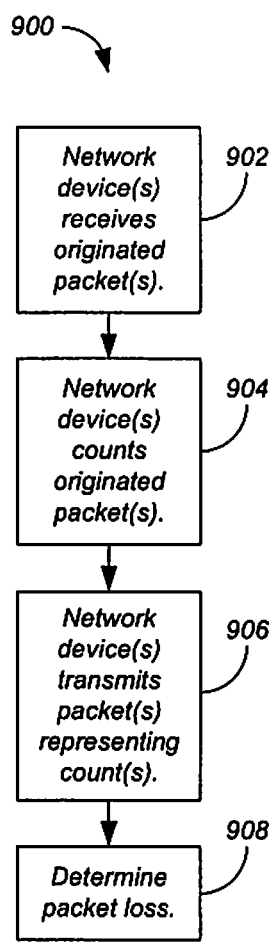
FIG. 9 shows a process for the ASIC of FIG. 6 to determine network throughput according to the one-way packet loss of the packets sent by the ASIC.

In some embodiments, ASIC 600 determines network throughput according to the one-way packet loss of the packets sent by ASIC 600, as shown in FIG. 9 as process 900. The packets originated and transmitted by port 606 are received by one or more network devices, which count the number of originated packets received and transmit one or more packets to ASIC 600 representing those numbers (step 902).

Controller 618 determines the packet loss based on the number of packets of data originated by packet generator 628 and transmitted by network transmit interface 616 to the network devices and the number of those packets that were received by the network devices (step 906).

In some embodiments, the packet loss can be calculated based on a subset of the packets such as a data flow according to specified properties of the packets. For example, the packet loss determination can be limited to packets having one or more specified qualities of service, for example to verify the quality-of-service performance of network 602. Other example properties include source and destination addresses of the packets and the like.

Figure 10:
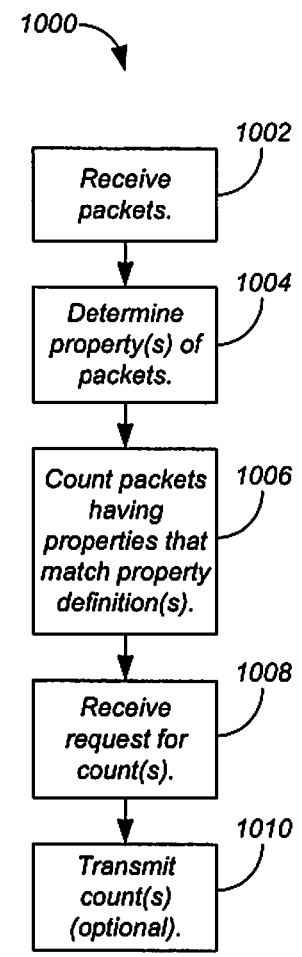
FIG. 10 shows a process for packet counting according to the present disclosure.

In some embodiments ASIC 600 also counts certain packets received from network 602, for example to support a packet loss calculation by another ASIC. FIG. 10 shows a process 1000 for such packet counting. Port 606 receives packets (step 1002) and stores them in ingress queues 620. Classifier 608 determines one or more properties of the packets (step 1004). The classifier 608 may be implemented according to a dual lookup for each packet, as described above.

One or more of counters 610 counts the number of received packets having properties that match one or more property definitions (step 1006). The property definitions can include, for example, a value for a field in the packets that indicates the packets were originated by port 606 in ASIC 600, a value for a field in packets that indicates the packets were originated by a port in another ASIC, one or more qualities of service for the packets, and the like.

ASIC 600 optionally transmits the packet count in response to a request. ASIC 600 receives a request for the contents of one or more of counters 610 (step 1008). In response, ASIC 600 transmits a packet of data including the contents of counter(s) 610 (step 1010).

ASIC 600 can be implemented in a network device such as a network interface card. The network interface card can include a user interface to provide the one or more packet definitions and property definitions to ASIC 600, and to retrieve data from ASIC 600, such as the contents of counter(s) 610.

The techniques disclosed herein can be implemented in digital electronic circuitry, or in computer hardware, firmware, software, or in combinations of them. Apparatuses of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The techniques can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. An integrated circuit comprising:
a first port configured to receive packets and a packet definition, wherein the packets are transmitted from a network to the integrated circuit, wherein one of (i) the packet definition is transmitted from a central processing unit of a host to the integrated circuit and (ii) the packets include the packet definition, and wherein the packet definition identifies characteristics of a packet;
a forwarding engine configured to (i) receive the packets from the first port and (ii) forward the packets to a second port;

a packet generator configured to (i) receive the packet definition and (ii) originate a test packet according to the packet definition; and a medium access controller configured to test the network by transmitting the test packet to the network.

2. The integrated circuit of claim 1, wherein the medium access controller is configured to separate the packet definition from the packets prior to the packets being received by the forwarding engine.

3. The integrated circuit of claim 1, wherein one of the packets includes the packet definition.

4. The integrated circuit of claim 1, wherein the port receives the packet definition from the central processing unit.

5. The integrated circuit of claim 1, further comprising a second port configured to transmit the packets excluding the packet definition to the network.

6. The integrated circuit of claim 1, wherein:
the packet definition is transmitted from a second network device over the network to a first network device; and
the first network device comprises the integrated circuit.

7. The integrated circuit of claim 6, wherein the packets are transmitted from at least one of the second network device and a third network device to the first network device.

8. The integrated circuit of claim 1, further comprising a counter configured to count a number of test packets, wherein the test packets are received by the first port from the network, and
wherein the test packets received from the network are transmitted to the first port in response to the test packet transmitted from the first port to the network.

9. The integrated circuit of claim 1, wherein the medium access controller comprises:
an egress queue configured to store packets received by the second port and from the forwarding engine;
a test queue configured to store the test packet originated by the packet generator; and
a scheduler configured to schedule packets stored in the egress queue and the test queue for transmission to the network, wherein the scheduler comprises
a first input in communication with the egress queue,
a second input in communication with the test queue, and
an output in communication with a network transmit interface.

10. The integrated circuit of claim 1, wherein:
the first port comprises a network receive interface;
the network receive interface is configured to receive a reply packet from the network;
the reply packet indicates a number of test packets (i) originated by the packet generator, (ii) transmitted by the network transmit interface to the network, and (iii) received by network devices of the network; and
the medium access controller is configured to determine a packet loss based on (i) the number of test packets and (ii) a number of test packets originated by the packet generator and transmitted by the network transmit interface to the network.

11. The integrated circuit of claim 10, wherein:
the medium access controller is configured to determine the packet loss based on properties of the test packets originated by the packet generator; and
the properties comprise at least one of
a source address of the reply packet,
a destination address of the test packets originated by the packet generator and transmitted by the network transmit interface,
a quality of service for the test packets originated by the packet generator and transmitted by the network transmit interface.

12. The integrated circuit of claim 1, wherein:
the first port comprises a network receive interface to receive the packets from the network; and
the integrated circuit further comprises
a classifier configured to identify the packets received by the network receive interface in reply to packets originated and transmitted by the first port or the second port, and
a counter configured to count a number of the packets received by the network receive interface in response to test packets originated and transmitted by the first port or the second port,
wherein the medium access controller is configured to determine a packet loss based on the count.

13. The integrated circuit of claim 1, wherein:
the first port comprises a network receive interface configured to receive the packets from the network; and
the integrated circuit further comprises
a classifier configured to determine properties of the packets received by the network receive interface, and
a counter configured to count a number of packets (i) received by the network receive interface and (ii) having properties matching property definitions received by the first port,
wherein the medium access controller is configured to determine a packet loss based on the count.

14. The integrated circuit of claim 13, wherein:
the counter is configured to increment when a packet received by the network receive interface has the properties matching the property definitions received by the first port;
the property definitions comprise at least one of
a value for a field in the packets indicates the packets were originated by the first port or the second port in the integrated circuit,
a value for a field in the packets indicates the packets were originated by a port in another integrated circuit, and
a quality of service for the packets; and
the first port is configured to
receive a request for the number of the packets, and
transmit a packet of data comprising the number of the packets.

15. The integrated circuit of claim 1, wherein:
the packet generator is configured to originate the test packet to have the characteristics of the packet identified in the packet definition; and
the characteristics comprise
an address definition identifying an address for the test packet, and
a load definition identifying a number of test packets originated by the packet generator.

16. The integrated circuit of claim 1, wherein:
the packet generator is configured to originate the test packet to have the characteristics of the packet identified in the packet definition; and
the characteristics comprise
a protocol definition identifying a network protocol for the test packet, and
a payload definition identifying a data pattern for a payload of the test packet.

17. The integrated circuit of claim 1, wherein:
the packet generator is configured to originate the test packet to have the characteristics of the packet identified in the packet definition; and the characteristics comprise
a data rate definition identifying a data rate at which the test packet is transmitted, and
a quality of service definition identifying a quality of service for the test packet.

18. The integrated circuit of claim 1, wherein the medium access controller is configured to transmit the test packet over the network to stress-test the network.

19. The integrated circuit of claim 1, wherein:
the first port and the second port support testing of the network while transporting the packets;
the first port and the second port receive and transmit the packets while generating and transmitting the test packet; and
the packets are separate from the test packet.

20. A first network device comprising the integrated circuit of claim 1, wherein:
the first network device is an end device for the packet definition;
the first port transmits the test packet to a second network device over the network; and
the second network device is an end device for the test packet.

* * * * *